United States Patent

Putzolu

Patent Number: 5,835,942
Date of Patent: Nov. 10, 1998

[54] DISTRIBUTED DATA CACHE FOR CACHED MULTIPROCESSOR SYSTEM WITH CACHE CONTROL FOR FILE-BY-FILE CACHE STATES

[75] Inventor: Franco Putzolu, San Francisco, Calif.

[73] Assignee: Tandem Computers Incorporated, Menlo Park, Calif.

[21] Appl. No.: 785,567

[22] Filed: Jan. 21, 1997

Related U.S. Application Data

[63] Continuation of Ser. No. 379,311, Jan. 23, 1995, abandoned.

[51] Int. Cl.$^6$ .................................................. G06F 12/00
[52] U.S. Cl. ............................. 711/113; 711/3; 711/118; 711/130; 711/139; 711/144; 707/200
[58] Field of Search .......................... 395/445, 457, 395/471, 472; 364/DIG. 1, DIG. 2, 243.4, 243.41; 711/3, 113, 118, 130, 139, 144, 145, 154; 707/200

[56] References Cited

U.S. PATENT DOCUMENTS

| | | | |
|---|---|---|---|
| 4,622,631 | 11/1986 | Frank et al. | 395/800 |
| 4,669,043 | 5/1987 | Kaplinsky | 395/275 |
| 4,833,599 | 5/1989 | Colwell et al. | 395/275 |
| 5,113,519 | 5/1992 | Johnson et al. | 395/600 |
| 5,175,851 | 12/1992 | Johnson et al. | 395/600 |
| 5,179,680 | 1/1993 | Colwell et al. | 395/275 |
| 5,274,787 | 12/1993 | Hirano et al. | 395/470 |
| 5,283,886 | 2/1994 | Nishii et al. | 395/471 |
| 5,287,473 | 2/1994 | Mohan et al. | 395/460 |
| 5,297,269 | 3/1994 | Donaldson et al. | 395/472 |
| 5,301,290 | 4/1994 | Tetzlaff et al. | 395/469 |
| 5,317,752 | 5/1994 | Jewett et al. | 395/750 |
| 5,327,570 | 7/1994 | Foster et al. | 395/800 |
| 5,347,648 | 9/1994 | Stamm et al. | 395/575 |
| 5,394,555 | 2/1995 | Hunter et al. | 395/800 |
| 5,410,654 | 4/1995 | Foster et al. | 395/275 |
| 5,535,386 | 7/1996 | Wang | 707/203 |

*Primary Examiner*—Tod R. Swann
*Assistant Examiner*—Tuan V. Thai
*Attorney, Agent, or Firm*—Philip H. Albert; Townsend and Townsend and Crew

[57] ABSTRACT

A cache is distributed among processors in a multiple processor system with no shared memory to maintain the cached data. Each processor maintains a cache which identifies the opened files being cached, the blocks of each file which are cached and the state of caching for each file. The state of each opened file is one of "no-caching", "read-caching" and "read/write caching". So long as only one processor opens a file, and opens it for read/write access, that processor is allowed to do read/write caching on the file. When a processor opens a file for read access, that processor is allowed to do read caching, unless another processor has the file open for read/write access. After the last processor having read/write access to a file closes the file, the disk system upgrades the cache state for the file. The downgrading of the caching state is communicated via an asynchronous cache callback signal, while the upgrading of a cache is not indicated to a processor until the processor sends a disk request for the file. The reply to the request contains the new cache state.

3 Claims, 3 Drawing Sheets

DISTRIBUTED DATA CACHE FOR CACHED MULTIPROCESSOR SYSTEM WITH CACHE CONTROL FOR FILE-BY-FILE CACHE STATES

This is a Continuation of application Ser. No. 08/379,311, filed Jan. 23, 1995, now abandoned.

BACKGROUND OF THE INVENTION

The present invention relates to the field of data caching in general, and in particular to the problem of caching in a multiprocessor system.

One use of a multiprocessor system is to provide redundancy. For example, if two processors in a multiprocessor system are running the same programs at the same time when one fails, the program can continue on the second processor. Of course, if the multiprocessor system contains a single point of failure, such as a shared electrical power source, failure at the single point causes failure of all the multiprocessors. Therefore, reducing single points of failure increases the reliability of the multiprocessor system and increases the probability that the failure will be a recoverable failure.

When a processor needs to read data from or write data to a disk system, there will be a certain delay for transferring the data, and obtaining the data from a disk in the case of reads. To improve performance, a cache is used between the processor and the disk system. The cache is able to input and output data faster than the disk system, so that when a block of data can be supplied by the cache instead of the disk system, performance improves.

In a typical multiprocessor system, where multiple processors have access to a single disk system, the cache is stored in a shared memory, where each processor has access to the shared memory. However, this presents a single point of failure and a more reliable caching system is needed.

SUMMARY OF THE INVENTION

The present invention provides a more reliable cache by having the cache distributed among the processors with no shared memory to maintain the cached data. In one embodiment, each processor of a multiprocessor system maintains a cache which identifies the files being cached, the blocks of each file which are cached and the state of caching for each file. The state for file opened by the processor for a process executing thereon is one of "no-caching", "read-caching" and "read/write-caching" (rd/wr for short; both reads and writes are cachable). So long as no processor opens a file for read/write access, each processor is allowed to do read caching on the file. When a processor opens a file for read/write access and another processor has the file open, no processor is allowed to cache the file. This is done by the disk system sending a cache downgrade message to the processors which have the file open and are caching it. When a processor opens a file or retrieves a block of data from a file, the disk system includes a flag indicating which cache state is allowed. After the last processor having read/write access to a file closes the file, the disk system indicates, on subsequent accesses, that the file can again be cached. Within a processor, multiple processes are running and more than one process can cache a file for read caching or read/write caching, under control of the file system program for the processor.

One advantage of the present invention is that synchronization of caches can be done without shared memory. The synchronization is done using inter-process messages between processors efficiently enough that a performance gain can still be had relative to a no-cache design.

A further understanding of the nature and advantages of the inventions herein may be realized by reference to the remaining portions of the specification and the attached drawings.

DESCRIPTION OF THE PREFERRED EMBODIMENTS

Figure 1:
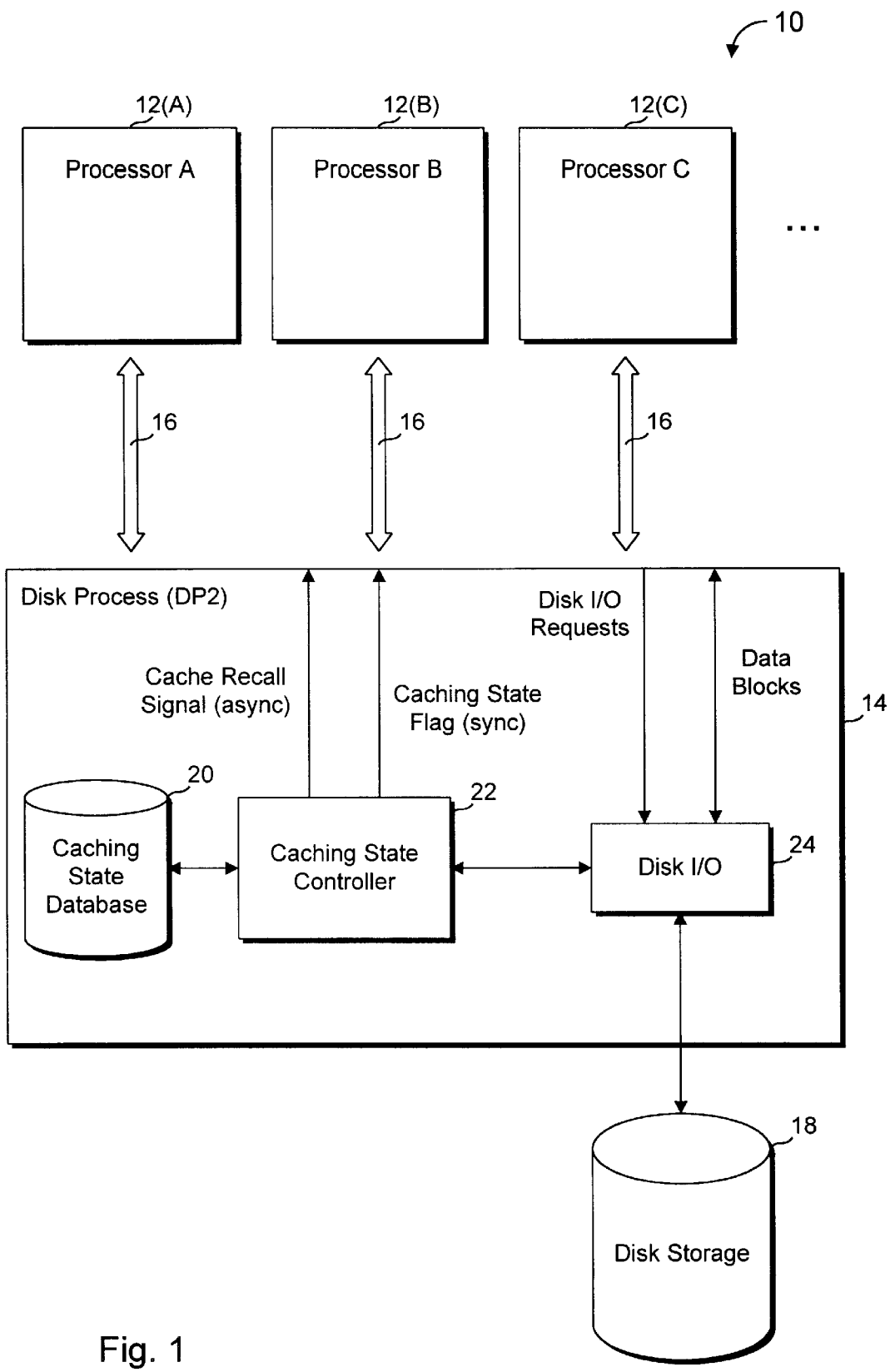
FIG. 1 is a block diagram of a multiprocessor system showing multiple processors and a disk system.

FIG. 1 is a block diagram of a multiprocessor system 10 which includes multiple processors 12 (processors 12(A)–(C) shown), a disk process 14 which communicates with processors 12 via IPC (interprocess communication) messages 16. A processor 12 includes memory for storing application programs being executed by a central processing unit (CPU) as well as memory for data used by the CPU and other elements of the processor. A program being executed by the processor is referred to as a process. Where multiple processes are running, it may be the case that not all of the processes are running at a single point in time, but due to time sharing, they are all logically being executed at the same time.

Disk process 14 is executed by one of the processors 12, so disk process 14 could communicate with other processes its hosting processor directly while communicating with processes on other processors via IPC messages. However, for robustness, symmetry and other reasons, disk process 14 operates as if its hosting processor is remote and only communicates with other processes on the hosting processor via IPC messages. As shown in FIG. 1, IPC messages are used to send a cache recall signal from disk process 14 to a processor 12, to send a disk I/O request from a processor 12 and disk process 14, to send a response to the request from disk process 14 to processor 12, and to send a caching state flag from disk process 14 to processor 12. To reduce the overhead of IPC messages, the caching state can be sent in the same IPC message as the response to the disk I/O request. To further reduce the overhead, IPC messages which will not have an effect are not sent. For example, a cache callback message for a file will not be sent to processors which do not have the file open or that already are not caching the file (as might be the case if the state was upgraded but the processor was never informed).

In one embodiment, processor 12 is a Tandem processor and disk process 14 is paired with a backup disk process 14' (not shown). The backup process 14' is kept up to date and takes over if the primary disk process 14 should fail. In this embodiment, processor 12 and its local memory are configured as a Tandem processor running Tandem's Nonstop Kernel with a Unix-like interface to the operating system (known as "OSS").

Disk process 14 controls access to a disk volume 18. One disk process 14 (or mirrored pair) exists for each disk volume accessible to the processors. Disk process 14 is shown including a state database 20, a state controller 22 and disk I/O 24. State database 20 maintains a list of which files are opened by which processes on which processors, the caching state for each file and the write access for each file for each process. State database 20 contains one entry for each "open", which means that each time a process opens a file, an entry is created in state database 20. In some implementations, the caching state is inferred from the write access and the number of different processors which have opened the file. An example arrangement of state database 20 is shown in Table 1.

TABLE 1

State Database 20

| File ID | Process ID | Cache State | Cache State (at processor) | Access Type |
|---------|------------|-------------|----------------------------|-------------|
| FileA | A-104 | No | No | R |
| FileA | B-245 | No | No | R/W |
| FileA | D-322 | No | No | R |
| FileB | A-048 | R | R | R |
| FileB | C-786 | R | No | R |
| FileC | A-001 | R/W | R/W | R/W |
| FileC | A-002 | R/W | R/W | R |
| ... | | | | |

If state database 20 is as shown in Table 1, FileA (in the typical embodiment, the File ID's are numbers associated with particular file names) is opened by processors A, B and D. Processor B has FileA open for read/write, so no processor is allowed to cache FileA. FileB is open for read only by processors A and C. Since each of processors A and C have only read access, the file is read cachable on both processors. However, processor C has not been yet informed of the upgrading of the cache state, so it still is not caching FileB.

FileC is open on only one processor, processor A, for two processes. The process ID field is used by disk process 14 to keep track of multiple opens of a file for a single processor. FileC is allowed a cache state of R/W since only one processor has the file open.

State database 20 also holds other data which is needed on a per open and per file basis, such as the open attributes and file attributes, which exist only on a per file basis. The open attributes are specified by a process when it opens a file and they include the access type, the O_APPEND flag (i.e., can be set to "true" or reset to "false"), the O_DSYNC flag and the position of a file pointer to the file.

The access type attribute is shown in Table 1 and can be either read or read/write. When the O_APPEND flag is set, all writes happen at the end of the file. When the O_DSYNC flag is set, all writes must be written through. These flags are only needed if the open is for read/write. The file pointer indicates where in the file the next read or write (unless O_APPEND is set) will occur. These attributes are cached at the file system of the processor to which the open belongs, unless a shared open across processors has occurred, in which case these attributes are kept by the disk process only. In OSS, an open and its attributes are shared across forked processes, so that whenever one forked process changes the value of one of the open attributes, the other forked process sees the change.

The disk process also maintains several data on a per file basis, including:

End-Of-File Position (EOF): This is needed by writers because they might update it. The EOF is used by readers to avoid reading beyond the file.

Allocated Size: Writers need to know this so that they don't write beyond the extent of the file and know when to effect additional extent allocation.

File Times: mtime (time of last modification), ctime (time of last change) and atime (time of last access) are all kept for the file.

File Attributes: S_NONSTOP is a file attribute in the file's header. If this attribute is set, the file is not cachable. This attribute is used for especially critical data, where the integrity of the file is more important than the performance improvement provided by read/write caching. With this attribute set, disk process 14 will also not read/write cache the file, but will write out data to disk volume 18 as it is received.

The file times are updated by writers, and if caching is allowed, the writers will cache these times. Readers only update atime, and will cache it if read caching is allowed. Times are really not cached, since the time activity occurs for a file is when the activity occurs at disk process 14. However, the file system caches the times for itself to avoid the need for messages to the disk process each time a time is needed.

State controller 22, as explained in more detail below, sends out cache recall signals, as IPC messages, to downgrade the cacheability of files on processors which have the file open. State controller 22 also provides state information to a processor at the time disk process 14 responds to a disk I/O request from that processor. This state information is usually used by the processor to upgrade the cacheability of a file. The caching states and the operation of the system shown in FIG. 1 are described in more detail following the description of FIG. 3. Because the upgrading of a cache is synchronous (does not occur until a disk I/O request), a processor might be more restrictive than necessary, but this is only until the processor has disk activity with the file. The downgrading of a cache is asynchronous, as it must happen as part of the open which causes the downgrading.

Figure 2:
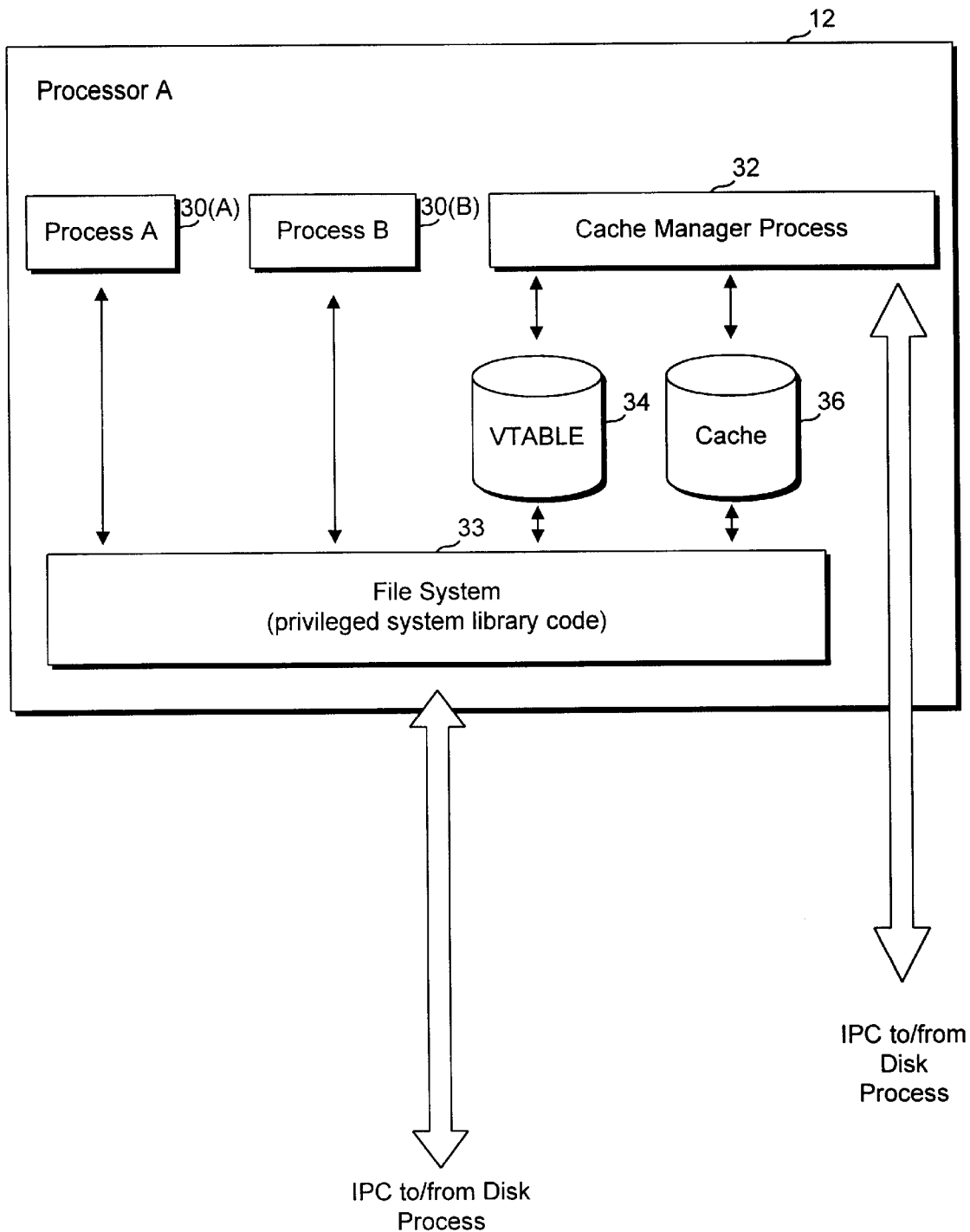
FIG. 2 is a more detailed block diagram of a processor shown in FIG. 1.

FIG. 2 is a more detailed block diagram of a processor 12, which executes one or more processes 30, including a cache manager process 32, which make file accesses from time to time by calling system library routines (read( ), write( ), open( ), close( ), etc.) in a file system 33 which is a set of routines of privileged system library code. Cache manager 32 interfaces with a cache 36 and a cache pointer table 34, both of which are local to processor 12 and are used for caching disk data (disk process 14 might also centrally cache data from disk volume 18). Cache pointer table 34 indicates, for each file open by processor 12, the allowed caching state for the file, along with other attributes. A file is open for a processor when at least one process on that processor has the file open. If at least one process on that processor has the file open for read/write, then that processor is said to have the file open for read/write.

Cache manager 32 and file system 33 are the only elements which communicate with disk process 14 and they do so using IPC messages, as described above. The disk I/O requests of interest here are:

Open Request: file system 33 requests from disk process 14 that a file be opened for a process. The request includes a file name (or other file identifier), an access type, the O_APPEND flag (if file opened for read/write), an initial position for a file pointer, and the O_DSYNC flag. Disk process 14 responds with the result of the open and the allowed caching state.

Close Request: file system 33 is requesting that the file be closed for a process. In some cases, as explained below, file system 33 will anticipate the resulting change in cache state.

Write Request: file system 33 requests that the block of data included with the request be written to disk volume 18. Disk process 14 will include the cache state with the reply.

Read Request: file system 33 requests that a block of data be read from disk volume 18. Disk process 14 will include the cache state with the block of data being read.

Lseek Request: file system 33 requests that the file pointer be moved to the specified location in the file.

Getpos Request: file system 33 requests the current position of the file pointer from disk process 14.

Truncate Request: file system 33 requests that the file be opened for read/write and that the file be emptied. This requires that cached reads be flushed, since thyey are no longer valid.

Cache Recall: disk process 14 requests from cache manager 32 that the cache for a file be recalled and its caching state be downgraded. Since this request is made by disk process 14, it is asynchronous, i.e., disk process 14 does not wait until the processor makes a request on the file.

The requests made by file system 33 are in response to calls made by a process 30 or the cache manager process 32. For each call, the file system 33 either handles the call from cache 36 and VTABLE 34, or file system 33 formulates an IPC message for the request and sends the message to disk process 14. The cache recall requests are initiated by disk process 14 and go to cache manager 32.

In a specific embodiment, cache 36 is divided into blocks of 4K bytes, and each entry (VNODE) in VTABLE 34 points to the first cache block in a linked list of cache blocks. The unused blocks might also be tracked using a linked list of unused blocks. VTABLE contains one VNODE entry for each file opened by processor 12 (i.e., each file opened by one or more processes 30 of processor 12). For each VNODE, VTABLE 34 maintains the following fields:

FILE ID: Often a handle number is used instead of file name.

CACHE STATE: This is one of:
  No-caching (most restrictive state)
  Read-caching
  Read/write Caching (least restrictive)

LINKED LIST HEAD: Points to cached blocks of the file

OPEN ATTRIBUTES: These are variables specific to the open, which are discussed above, such as file pointer position, access type, etc.

Actually, a file can have a fourth caching state: "not open", but this isn't a state found in VTABLE since it only has entries for files which are open.

Cache manager 32 and file system 33 also track a caching sequence number (SEQNO). This number is used as a label for the various communications between cache manager 32, file system 33 and disk process 14, so that these processes can determine the proper order to respond to requests.

Figure 3:
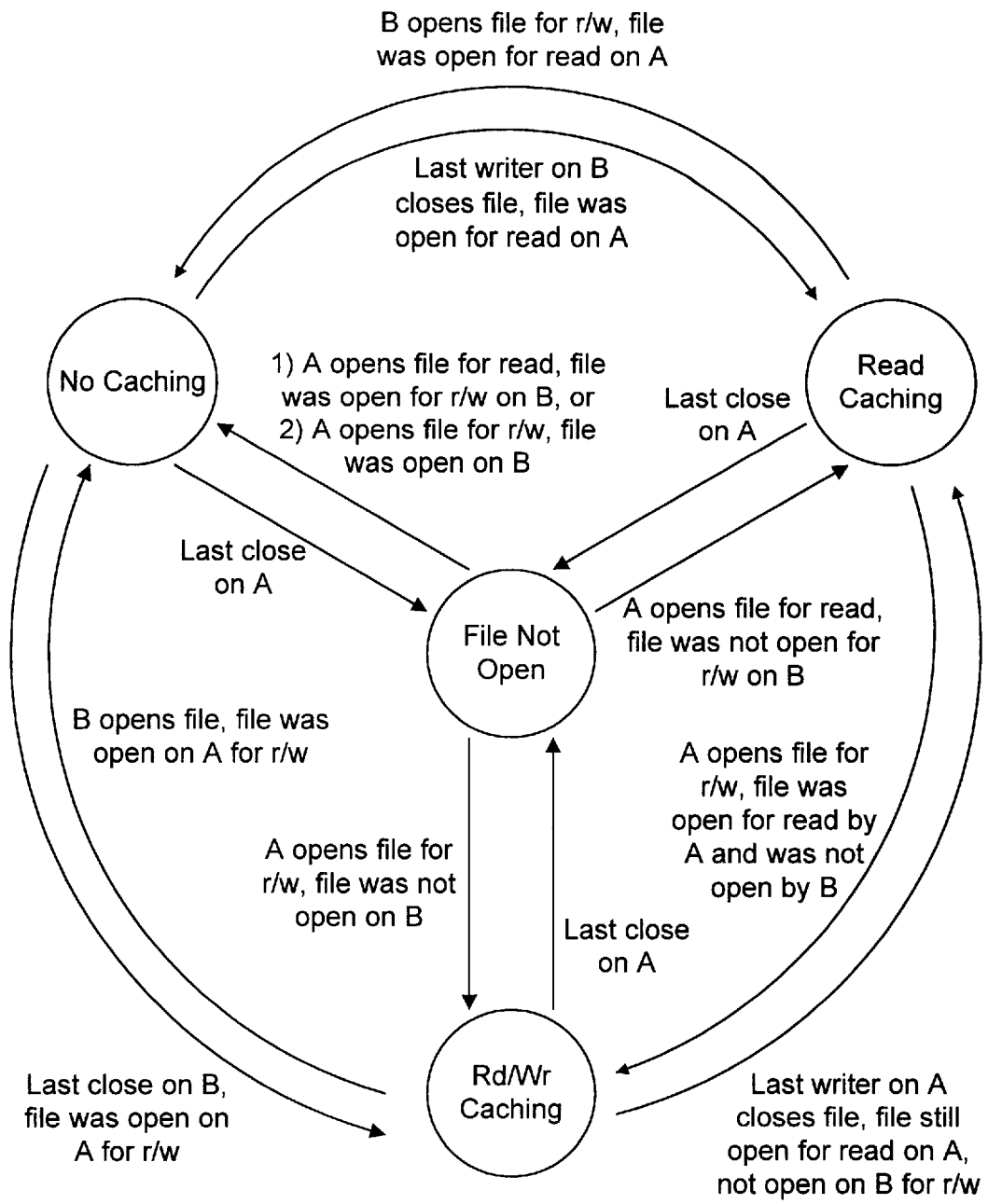
FIG. 3 is a state diagram for a file being cached in a processor.

FIG. 3 is a state diagram showing the states of a file and the transition events which cause the transition from state to state. The state of a file is the same over all processors which have the file open, although some processors might not yet have upgraded the state. A file's state is upgraded by changing it from a more restrictive state to a less restrictive state, and downgrading is the opposite of upgrading. For those processors on which the file is not open, the state is "not open". For clarity, the transition events of FIG. 3 only involve two processors, A and B, although is should be apparent from the figure that the state diagram for a multi-processor system with more than two processors occurs merely by changing the phrase "processor B" to "any processor other than processor A". The states shown are for one file on processor A (and any other processor which has the file open when, and only when, processor A has the file open).

The transitions are as follows:

NOT OPEN→NO-CACHING

This transition occurs when processor A opens the file for reading and processor B already has the file open for read/write. This transition also occurs when A opens the file for read/write and processor B already has the file open (for reading or read/write). When one writer has the file open, and not all the openers are on the same processor, no caching is allowed, since the processes might not "see" the same data. This problem would occur where one process believes it has written the data, but it is still in the cache, and the one process signals a request to another process to read the data. That other process, if it is on another processor, would not be able to read the updated data, so it would read out of date data. If all processes are on the same processor, that processor can control the process interaction internally so that a reader reads the latest data either from the disk or the cache, which is local to the processor but shared among processes on that processor.

Processor A does not keep track of the opens on processor B, but is told by disk process 14 in the reply to the open( ) request that the file cannot be cached. Disk process 14, as part of the open( ) request, will also handle recalling the cache from processor B if it has been caching the file. For a recall, the cache is flushed, i.e., all of the blocks being read cached are removed from cache 36 and all of the blocks being write cached are sent to disk process 14.

Where a file is opened by a processor in a remote multiprocessor system, no data caching is allowed for that file.

NOT OPEN→READ-CACHING

This transition occurs when processor A opens the file for reading and processor B, if it has any files open, does not have them open for read/write. Processor A is informed of this caching state in the reply to the open request.

If processor A opens the file for read/write and either the O_DSYNC flag for the open or the S_NONSTOP flag for the file are set, the file is opened without write caching (but possibly with read caching). For simplicity, in some embodiments, write caching is disabled on all processors when any processor opens the file with the O_DSYNC flag set. If the S_NONSTOP flag is set, then updates sent to disk process 14 will be checkpointed. Checkpointing is the process of synchronously bringing a backup process (backup disk process 14', in this case) up to date before completing an action.

NOT OPEN→READ/WRITE CACHING

This transition occurs when processor A opens the file for read/write and processor B does not have the file open. Processor A is informed of this caching state in the reply to the open request.

NO-CACHING→NOT OPEN
READ-CACHING→NOT OPEN
READ/WRITE CACHING→NOT OPEN

These three transitions occur when processor A last closes the file. Processor A treats them as downgrades, since they require that the caches be flushed as part of the closing process. Following the flush, processor A deletes the corresponding VNODE from VTABLE 34.

READ/WRITE CACHING→NO-CACHING

This transition occurs when processor B opens the file, for reading or read/write. Processor A is alerted to this downgrade via a cache callback message.

READ-CACHING→NO-CACHING

This transition occurs when processor B opens the file for read/write. If processor A is read caching only, then it is not a problem to have processor B reading the file, but if processor B is writing the file, processor A cannot cache the file. Processor A is alerted to this downgrade via a cache callback message.

NO-CACHING→READ/WRITE CACHING

This transition is an upgrade which occurs when the last opener on processor B closes the file. Disk process 14 waits until the next access of the file by processor A to inform processor A of the upgrade. Thus, for a time, processor A might be out of date and have a more restrictive caching state than is required. Of course, disk process 14 could make an extra effort and send a message to cache manager 32 informing it of the upgrade, but that overhead does not provide much gain, since the cache is updated on the next access. Since the file was not being cached, this means that the first I/O request after the upgrade will catch the upgrade.

NO-CACHING→READ-CACHING

This transition is handled similarly to the previous one. It occurs when the last writer on processor B closes the file.

READ/WRITE CACHING→READ-CACHING

This transition occurs when the last writer on processor A closes the file, but other processes still have the file open for reading. Since this transition can be completely predicted by processor A (i.e., it requires no information about processor B), processor A effects the downgrade synchronously with the request, and disk process 14 assumes that the processor will take care of it, thus saving a message.

READ-CACHING→READ/WRITE CACHING

This transition occurs when processor A has the file open for reading and processor B doesn't and processor A first opens the file for read/write. When processor A first opens the file for writing, it will know that the caching state will change, and will give exclusive control of the VNODE to cache manager 34. The caching state will either be upgraded to write caching, if processor B doesn't have the file open, or it will be downgraded if processor B does have the file open.

Caching Sequence Number (seqno)

Because of the asynchronous processing of caching state changes, they need to be sequenced to avoid them being processed out of order. Therefore, each request which includes a caching state change will also include a caching sequence number (seqno). Since the disk process decides when the state changes occur, it increments the seqno, although cache managers 32 on the various processors also store the value. File system 33 will not process caching state changes if the changes have a seqno less than the current seqno, because those changes have already been implemented, since disk process 14 only increments the seqno after all the changes for that seqno have been successfully completed.

If file system 33 sends a request which might alter a caching state, the request includes the file system's seqno (the file system might maintain one seqno per open, but it is sufficient to have one seqno per processor). If the seqno is less than the current seqno, disk process 14 processes the request, but if the seqno is greater than the current seqno, disk process 14 queues the request. The latter case is possible where a process is making a request but the cache manager has not yet completed cache callback processing.

The following is a description of the flow of events which occur for several different scenarios in which a cache callback occurs. As above, the description assumes that the activity is occurring on processor A and that a processor B is also part of the multiprocessor system. As should be apparent, no generality is lost.

Processing a request when no callback is in progress

1. Requests with a seqno larger than the current seqno are impossible, since each processor is updated in sync with disk process 14. If processor A sends such a request, it is halted by disk process 14 to prevent further corruption.

2. Each request can be handled by disk process 14 when it arrives and does not need to be queued.

Processing an open request which triggers a callback

1. The file system 33 of processor A anticipates the possibility of a cache callback and, prior to sending a message to disk process 14, acquires exclusive rights for to modify the file's VNODE.

One way the exclusive rights are controlled is via an exclusive VNODE semaphore. This is a flag associated with a VNODE which is set by a process which desires exclusive write control of the VNODE and is reset when the process no longer needs exclusive write control. Of course, a process cannot set the flag if it is already set by another process. If this is the case, the later process usually "blocks" and waits for the flag to be reset, at which point it acquires the exclusivity by setting the flag.

2. The open request is processed and replied to with the new caching state (which is "no-caching") and the new caching seqno. The current seqno at disk process 14 is still the seqno of just before the callback, since it is not updated until the entire caching state change is resolved. Thus, it is possible for processor A to process the callback and start to send more requests to disk process 14 before other processors have responded to the callback. In that case, the requests have the higher (by one) caching seqno and are queued by disk process 14.

3. If processor B is caching data for the file, disk process 14 sends it a cache callback request (i.e., all other processors which cache data for the file are sent the request). The new state is always "no-caching" and cache callback messages are not sent to processors which are not caching the file (usually because they never found out about a caching state upgrade).

4. The new caching state and seqno are set for all processors, regardless of whether or not they are notified of the callback.

5. The caching seqno is made the current seqno once the entire callback is resolved.

Processing a request when a cache callback is in progress

1. A request which includes the callback seqno is queued by disk process 14, since it came from a processor which is up to date, but the other processors are not yet confirmed up to date.

2. A request with a seqno smaller than the callback seqno will be processed, and disk process 14 will reply with the callback seqno and the new state (which is always "no-caching"). This reply might not be acted upon by the file system immediately, since it might not be able to acquire the exclusive VNODE semaphore. However, disk process 14 will know when it is complete, because the processor will reply to the callback request.

3. A request cannot have a seqno which is larger than the callback seqno. Disk process 14 will halt a processor if it sends such a request.

4. The first open from a processor does not need a seqno. This request will be processed and be given a caching state of "no-caching".

Processing after all callback requests are processed

1. At this point, all processors have updated their copy of the caching state and have responded to that effect to disk process 14.

2. Disk process 14 makes the callback seqno the current seqno.

3. The caching states of all processors are recalculated. If a state is upgraded (due to a close or processor failure during the callback procedure), it is upgraded and the seqno is incremented again.

Disk Process 14 Handling of Requests

Disk process 14 handles requests on a file from processor A as follows:

Open Request

If processor B is write caching the file when processor A sends an open request, disk process 14 will complete a cache callback before completing and responding to the open request.

If processor A's request is for a read/write open, and processor B is read caching, disk process 14 will complete a cache callback before completing and responding to the open request. If processor A is already a read-caching processor, it will anticipate the possible need for a callback. IF a callback is warranted, disk process 14 will inform processor A in the reply to the open, and processor A should be able to handle the cache downgrade synchronously.

Close Request

When processor A is caching the file and processor A sends the final close for the file, then the cache for that file needs to be invalidated. File system 33 will anticipate this and acquire the exclusive vnode semaphore before sending the close message to disk process 14. This guarantees that file system 33 can downgrade the caching state synchronously upon receipt of the close reply.

Similarly, when processor A is doing read/write-caching and the current request is a close on the last write open for the file (but not the last open), then the cache needs to be downgraded. Again, file system 33 will anticipate the need by acquiring the exclusive vnode semaphore and will perform the downgrade of the caching state prior to sending the request.

The caching seqno in the close request is not used, as all close requests are processed immediately.

Read requests

Read requests are legal from a processor with caching state of no-caching or read-caching. Read requests are illegal from a processor that does read/write caching because it should do read-block requests, which are checked against cache 36 before being serviced. To benefit from caching, read requests from a read-caching processor should also be read-block requests.

Read requests with a seqno equal to the current seqno will be processed, unless the above rules are violated.

Read requests with a seqno smaller than the current one will always be processed. Even if the originating processor does read/write caching, this request will be processed because, in order for this to occur, the originating processor cannot have processed the notification to upgrade the caching state to read/write-caching.

Read requests with a seqno larger than the current one will be queued. These are only possible from processors participating in a cache callback.

Read-block requests

Read-block requests are only legal from processors which do read caching or read/write caching. Read-block requests are always illegal (regardless of the seqno) from non-caching processors because either disk process 14 never notified the processor that it could do caching, or disk process 14 did a cache callback. In the latter case, disk process 14 will only update the caching state after file system 33 has processed the caching state change.

Read-block requests with a seqno equal to the current one will be processed, unless the above rules are violated.

Read-block requests with a seqno smaller or greater than the current one are impossible because the changing of the caching state in a caching processor is always done synchronously.

Write requests

Write requests are illegal from read-caching processors. A write request with a seqno equal to or less than the current one will be processed, unless the request is illegal. Note that disk process 14 cannot process a write if it doesn't own the EOF for the file.

A write request with a seqno larger than the current one will be queued. Such a request might occur if the requesting processor is participating in a cache callback.

Write-block requests

Write-block requests are only legal from a processor for a file with has a caching state of read/write-caching. Write-block requests are always illegal (regardless of the seqno) from non-read/write caching processors because, for them to happen, either disk process 14 never notified the processor that it could do read/write caching or disk process 14 did a cache callback. In the latter case, disk process 14 will only update the caching state after file system 33 has processed the caching state change.

Write-block requests with a seqno equal to the current one will be processed, unless the above rules are violated.

Write-block requests with a seqno smaller or greater than the current one are impossible because the changing of the caching state in a caching processor is always done synchronously.

Position caching

Typically, the file pointer position and the O_APPEND flag are cached by file system 33.

After a fork and an exec across processors, opens might be shared across processors. In these cases, the position cannot be kept by file system 33 because more than one file system is involved. Thus, disk process 14 will be the keeper of the position. If the open reverts back to not being shared across processors anymore, disk process 14 will give the position back to file system 33.

If needed or requested or desirable by file system 33, the position is passed synchronously to disk process 14 at exec time via a "propagate open request". The position is passed asynchronously back to file system 33 via reply of the following requests: open, read, write, lseek, getpos.

Fault-tolerance and data integrity with file system caching

Data caching raises a number of issues which are handled by the present invention. For example, if a read/write caching processor fails, then all the cached dirty (written to cache, but not written to disk) file-blocks and the cached dirty eof will be lost. Disk process 14 must then assume that the EOF currently associated with the file (in the file label) is the correct one and continue processing.

Without special precautions, this processor failure scenario could leave "holes" in the file. A hole is an area in the file before the EOF which contains garbage data. To avoid unexpected consequences, disk process 14 will ensure that every byte before the EOF is either explicitly written by a process or it is filled with "00" bytes. To avoid such holes, disk process 14 will disallow writes beyond the EOF stored in the file label. Disk process 14 will update the EOF in the file label whenever a write ends beyond the EOF in the file label. In other words, file system 33 needs to write the dirty blocks to disk process 14 in ascending order.

Another concern is where a position caching processor fails. In this case, if only one processor is position caching, then only the position for that processor is lost, without further consequence. If more than one processor is sharing an open, then the position is not cached and is not lost when one of the processors fails.

When O_DSYNC is true, disk process 14 will not keep dirty data or a dirty EOF for that open in memory. Dirty data and EOF updates will be written to disk before the request is replied to. Note that there may exist other non-O_DSYNC write opens; such opens do not write through their data and EOF updates.

When O_DSYNC is true, disk process 14 will not allow read/write caching on the file, because it doesn't make sense to pay for the overhead of writing through every update in disk process 14 while buffering dirty data in the opener processor.

The values of the times are always written to disk before being sent to the requester. Therefore, there are no fault-tolerance considerations with the cached times.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A distributed cache for a multiprocessor system, comprising:

a plurality of processors, each processor comprising a disk access means and a cache;

a disk system which stores data in files and is accessed for reading and writing by the disk access means of each of the plurality of processors;

the cache of each processor further comprising means for identifying a caching state of each file opened by said each processor wherein a file is the unit for which caching state is maintained; and the disk system further comprising:

file control means for tracking which files have been opened; and global cache control means, located within the disk system, for asynchronously indicating a no-cache state for a file to each processor accessing the file when a first processor opens the file for read and write access while a second processor has the file open for read access, such that the first and second processors have access to the file, and for indicating a permissible caching state for files being accessed by said each processor, wherein each processor comprises means for flushing its cache to the disk system in response to an asynchronous cache recall of a file from a cached state to a no-cache state wherein the no-cache state is a state where more than one processor accesses the file, the global cache control means being global in that it controls caching for each processor accessing files from the disk system.

2. The apparatus of claim 1, wherein said caching state is one of (a) a no-cache state, wherein the processors do not cache the file, (b) a read-only cache state, wherein a processor caches only reads, and (c) a read-write cache state, wherein a processor caches reads and writes.

3. A method of indicating a cache state for a file in a multiprocessor system where files are served from a disk process including a global cache controller to a plurality of processors, comprising the steps of:

in a response to a file read open request from a first processor of the plurality of processors, including a read cache state for the file with the response, the read cache state being either a read cacheable state indicating that the file can be cached for reading at the first processor or a read noncacheable state indicating that the file cannot be cached for reading at the first processor, wherein the read cache state is the read noncacheable state when a second processor of the plurality of processors has the file open and cached for read/write access;

in a response to a file read/write open request from the first processor, including a read/write cache state for the file with the response, the read/write cache state being either a read/write cacheable state indicating that the file can be cached for reading and writing at the first processor or a read/write noncacheable state indicating that the file cannot be cached for reading and writing at the first processor but can be accessed without caching for reading and writing, wherein the read/write cache state is the noncacheable state when the second processor has the file open and cached for read/write access;

in response to a file open request from another processor of the plurality of processors for a file which is open and cached for read/write at the first processor, sending a cache recall to the another processor independent of requests from the first processor; and in response to a file read/write open request from the another processor for a file which is open and cached at the first processor, sending a cache recall to the first processor independent of requests from the another processor.

\* \* \* \* \*